United States Patent [19]

Schwarz

[11] Patent Number: 4,515,928

[45] Date of Patent: May 7, 1985

[54] ORGANIC PEROXIDE COMPOSITION CONTAINING TRIHYDRIC ALCOHOL, ALKALI OR ALKALINE EARTH METAL CHLORIDE, OR MONOSACCHARIDE

[75] Inventor: Richard A. Schwarz, Akron, Ohio

[73] Assignee: PPG Industries, Inc., Pittsburgh, Pa.

[21] Appl. No.: 400,197

[22] Filed: Jul. 20, 1982

[51] Int. Cl.$^3$ .............. C08F 2/00; C01B 13/00; C01B 15/00; C07K 3/00
[52] U.S. Cl. .............. 526/200; 252/186.42; 526/227; 526/228; 526/230.5; 526/344.2; 526/210; 526/237
[58] Field of Search .......... 526/200, 227, 228, 230.5, 526/210, 237; 252/186.42

[56] References Cited

U.S. PATENT DOCUMENTS

| | | | |
|---|---|---|---|
| 3,182,026 | 5/1965 | Leviskis | 252/430 |
| 3,794,472 | 2/1974 | Macaluso et al. | 44/6 |
| 3,795,630 | 3/1974 | Jaspers et al. | 252/426 |
| 3,825,509 | 7/1974 | Miller | 260/86.3 |
| 3,966,696 | 6/1976 | Kidoh et al. | 526/200 |
| 3,988,261 | 10/1976 | Barter et al. | 252/431 C |
| 4,039,475 | 8/1977 | Oosterwijk | 252/431 R |
| 4,186,259 | 1/1980 | Bush et al. | 526/227 |
| 4,287,236 | 9/1981 | Kestner et al. | 427/221 |
| 4,379,883 | 4/1983 | Zecher | 526/237 |

FOREIGN PATENT DOCUMENTS

| | | |
|---|---|---|
| 32757 | 7/1981 | European Pat. Off. |
| 43-6474 | 3/1968 | Japan |
| 51-84806 | 7/1976 | Japan |
| 54-107482 | 8/1979 | Japan |
| 55-6613 | 2/1980 | Japan |
| 56-86113 | 7/1981 | Japan |
| 2083374 | 3/1982 | United Kingdom |

Primary Examiner—Joseph L. Schofer
Assistant Examiner—Peter F. Kulkosky
Attorney, Agent, or Firm—Irwin M. Stein

[57] ABSTRACT

Non-segregating, pumpable, aqueous organic peroxide compositions comprising from about 10 to 65 weight percent of an organic peroxide are described. The compositions are prepared by forming an aqueous dispersion of the organic peroxide utilizing an emulsifying amount of a surfactant and thereafter mixing the peroxide dispersion with a freezing point depressant (or aqueous solution thereof) selected from the group consisting of polyhydric alcohols containing at least three hydroxyl groups, poly($C_2$–$C_3$) alkalene glycol having a molecular weight of less than 320, $C_4$–$C_6$ monosaccharides, the halide salts of the alkali metals and magnesium, and mixtures of such compounds. A sufficient amount of the freezing point depressant is used to provide a liquid peroxide composition that is readily pumpable at from 0° C. to −20° C. Organic peroxides described are dialkylperoxydicarbonates, diacylperoxides and peresters.

7 Claims, No Drawings

ORGANIC PEROXIDE COMPOSITION CONTAINING TRIHYDRIC ALCOHOL, ALKALI OR ALKALINE EARTH METAL CHLORIDE, OR MONOSACCHARIDE

DESCRIPTION OF THE INVENTION

The present invention relates to a non-segregating, pumpable, liquid organic peroxide-containing aqueous composition and the use of such compositions for the polymerization of ethylenically saturated monomers.

The polymerization of ethylenically unsaturated materials susceptible to free-radical polymerization, e.g., unsaturated vinyl-type monomers, such as vinyl chloride, with organic peroxides is well documented in the literature. The polymeric products produced from such polymerizations have found extensive commercial applications. Much of the polymerization of vinyl halides, such as vinyl chloride, vinyl bromide or vinyl fluoride (or copolymerization of such vinyl halides with vinylidene halides such as vinylidine chloride, vinylidine fluoride or other terminal vinyl-unsaturated containing compounds) is conducted in an aqueous medium, i.e., an emulsion or suspension polymerization. In such polymerizations, the monomer or mixture of monomers to be polymerized is dispersed in water in the presence of a surfactant and thereafter the polymerization initiated with an organic peroxide.

Some of the highly reactive organic peroxides which are used as initiators in the aforesaid polymerizations are prepared and shipped as solutions in compatible solvents, e.g., mineral spirits or other hydrocarbons, such as hexane, cyclohexane, toluene, etc. Diluting highly reactive organic peroxides in hydrocarbon solvents generally reduces the hazards associated with an autoaccelerative decomposition of the peroxide; however, such solutions must still be maintained at less than ambient temperature to prevent significant loss of assay from slow decomposition of the peroxide. Shipment of dilute hydrocarbon solutions of organic peroxides has several disadvantages. First, the organic peroxide and solvent may phase separate at low temperatures, thereby providing a concentrated mass of the organic peroxide, which can be hazardous. Second, in the event of a spill, the hydrocarbon solvent can evaporate leaving a residue of relatively undiluted peroxide—a hazardous condition. Third, in the event of a fire, the solvent, which is usually flammable, contributes to the conflagration.

Other highly reactive percarbonates, such as diisopropyl peroxydicarbonate, di-n-propyl peroxydicarbonate and di-secondarybutyl peroxydicarbonate, are shipped under refrigeration as frozen solids or undiluted liquids. This method of shipment requires special handling techniques because of the concentrated nature of the peroxide.

It has been suggested that the storage and handling of organic peroxides by the end-user can be facilitated if, immediately prior to use, an emulsion or dispersion of the initiator is prepared. U.S. Pat. No. 3,825,509 describes a process for the suspension polymerization of vinyl chloride wherein the initiator is an aqueous emulsion of an organic peroxide in which the peroxide is present in an amount up to 19 weight percent. The surfactant used to prepare the aqueous peroxide emulsion is a combination of polyvinyl alcohol and polyoxyethylene sorbitan monolaurate. Emulsions containing greater than about 19% by weight of organic peroxide are described as being too viscous and therefore difficult to handle.

U.S. Pat. No. 4,039,475 describes aqueous suspensions of organic peroxides that are solid at about 20° C. The aqueous suspension contains a combination of non-ionic emulsifiers, or nonionic and anionic emulsifiers, which permits the preparation of an aqueous suspension of solid organic peroxides in which the peroxide is present in amounts of from about 20 to about 50 weight percent. In order to prevent segregation of the solid peroxide from the suspending aqueous medium, thickeners are added to the suspension. Such suspensions are described as being chemically stable at about 20° C.

Some highly reactive organic peroxides, such as the lower alkyl peroxydicarbonates, are normally liquid at 20° C. and are used as polymerization initiators at relatively mild, e.g., 20°–60° C., polymerization temperatures. Consequently, the storage of such peroxides at 20° C. would result in a significant loss of assay in a relatively short time span, e.g., 1 to 5 days.

U.S. Pat. No. 3,988,261 describes the preparation of aqueous organic peroxide emulsions which exhibit stability to freeze-thaw cycling. The emulsion can comprise from about 30–75 weight percent of the organic peroxide and, when frozen, provides a safe, physical form for storing, handling and shipping these highly reactive organic peroxides.

Although the frozen emulsified peroxide compositions of U.S. Pat. No. 3,988,261 provide many advantages for the handling of highly reactive peroxides, it is necessary for the end-user to provide special equipment for handling and thawing the frozen product. Consequently, it would be even more desirable to provide a pumpable product which can be shipped and forwarded directly from on-site storage to the polymerization vessel.

It has now been discovered that a non-segregating, pumpable, aqueous organic peroxide composition, which is liquid at 0° C. or less can be prepared by the addition of a member selected from the group consisting of polyhydric alcohols containing at least three hydroxyl groups, poly($C_2$-$C_3$)alkylene glycol having a molecular weight of less than 320, $C_4$-$C_6$ monosaccharides, the halide salts of the alkali metals and magnesium, and mixtures of the aforesaid materials to an aqueous organic peroxide dispersion. The pumpable peroxide composition will commonly contain from 10–65 weight percent of the organic peroxide which are exemplified by dialkyl peroxydicarbonates, diacyl peroxides and peresters.

DETAILED DESCRIPTION

In accordance with the present invention, a member selected from the group consisting of polyhydric alcohols containing at least three hydroxyl groups poly($C_2$-$C_3$)alkylene glycols having a molecular weight of less than 320, $C_4$-$C_6$ monosaccharides, the halide salts of alkali metals and magnesium, and mixtures of such compounds are added to an aqueous organic peroxide, dispersion in amounts sufficient to provide a liquid composition at temperatures of 0° C. or below. Typically, the aforesaid materials are added in amounts of between about 2 and about 30 weight percent, basis the water in the peroxide dispersion. More typically, between about 2 and about 25 weight percent, e.g., between 5 and 20 weight percent, of the aforementioned compounds are added to the dispersion. The addition of such compounds to the peroxide dispersion lowers its freezing point and permits the preparation of a liquid composition which remains pumpable at temperatures of from 0° C. to about −20° C., e.g., from 0° C. to −10° C. Generally, the lower the storage temperature, the larger the quantity of the freezing point depressant compound required. Moreover, different amounts of the aforementioned compounds will be required to achieve the same freezing point depression.

Examples of the polyhydric containing at least three hydroxyl groups are aliphatic hydrocarbons containing from 3 to 6 carbon atoms and at least three hydroxyl groups, e.g., glycerol, pentaerythritol and 1,2,6-hexanetriol.

Examples of poly($C_2$-$C_3$)alkylene glycols are those materials represented by the graphic formula

RO(CH$_2$CH$_2$O)$_x$H     (1)

wherein R is hydrogen, methyl or ethyl and x is a number of from 1 to 6 more commonly 2 to 5. When R is hydrogen, x is at least 2. The polyalkylene glycols used in the present process preferably have a molecular weight of less than 320 and, more preferably, a molecular weight less than 200.

Examples of the $C_4$-$C_6$ monosaccharides are glucose, fructose, sorbitol, mannitol, dulcitol, arabinose, xylose, ribose, and apiose. Among the metal halide salts contemplated for use in the present invention are sodium chloride, lithium chloride, potassium chloride and magnesium chloride. While other halide salts are contemplated, e.g., the bromide and iodide salts, the chloride salts are preferred.

In a further embodiment of the present invention, between about 2 and 30, more typically between about 5 and 20, weight percent of a freezing point depressant selected from the group consisting of $C_1$-$C_4$ alkanols, e.g., methanol, ethanol, propanol, and butanol, and $C_2$-$C_4$ glycols, e.g., ethylene glycol, propylene glycol and 1,4-butane diol are incorporated into the compositions of the present invention. Also contemplated are mixtures of such alkanols and glycols.

The present invention is applicable to aqueous dispersions of organic peroxides useful in the free radical polymerization of ethylenically unsaturated materials and particularly to the polymerization of such materials in an aqueous medium, e.g., a suspension or emulsion polymerization. Preferably, the organic peroxide is a liquid at 0° C. and more preferably is a liquid at −5° C. Still more preferably, the organic peroxide is liquid at from −10° to 20° C. When the peroxide is a liquid at the temperatures to which it is exposed, the peroxide dispersion is more commonly referred to as an emulsion.

Examples of organic peroxides contemplated for use in the present invention are organic peroxydicarbonate esters, diacyl peroxides and organicperoxyesters. The organic peroxydicarbonate esters can be represented by the following graphic formula:

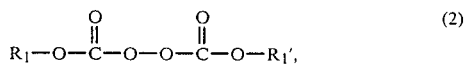

$$R_1-O-\overset{O}{\underset{\|}{C}}-O-O-\overset{O}{\underset{\|}{C}}-O-R_1',\quad (2)$$

wherein $R_1$ and $R_1'$ are each an alkyl radical of from 2 to 8 e.g., 3 to 4, carbon atoms. More particularly, $R_1$ and $R_1'$ can each be selected from the group consisting of ethyl, n-propyl, isopropyl, n-butyl, isobutyl, secondary butyl, capryl and 2-ethylhexyl. Preferably, the peroxydicarbonate ester is di-n-propyl peroxydicarbonate, diisopropyl peroxydicarbonate, di-secondarybutyl peroxydicarbonate and di-2-ethylhexyl peroxydicarbonate. Although diisopropyl peroxydicarbonate ($R_1$ and $R_1'$ = isopropyl) has a melting point of about 8°–10° C., it is included among the group of peroxydicarbonates contemplated since stable, i.e., non-segregating, suspensions of this peroxide can be prepared.

Peroxydicarbonate esters are well-known in the art and many are commercially available. Peroxydicarbonate esters are prepared typically by reaction of the corresponding alkyl chloroformate with aqueous sodium peroxide at low temperatures, e.g., 0° C.–10° C., as described, for example, in the Journal of American Chemical Society, Volume 72, page 1254 (1950) and in U.S. Pat. No. 2,370,588.

Examples of diacyl peroxides contemplated are those represented by the following graphic formula:

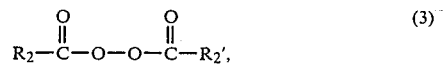

$$R_2-\overset{O}{\underset{\|}{C}}-O-O-\overset{O}{\underset{\|}{C}}-R_2',\quad (3)$$

wherein $R_2$ and $R_2'$ are each an alkyl radical of from 2–4 carbon atoms. Thus $R_2$ and $R_2'$ can each be ethyl, n-propyl, isopropyl, n-butyl, or secondary butyl. Of particular interest is diisobutyrl peroxide. Diacyl peroxides are prepared commonly by treating the appropriate acid chloride or anhydride with sodium peroxide or with hydrogen peroxide in the presence of a base, e.g., pyridine. See for example, Organic Peroxides, Volume I, page 65, D. Swern, Ed., John Wiley & Sons, New York, 1970.

Examples of peroxyesters contemplated are the alkyl and α-cumyl esters of peroxycarboxylic acids, the acid portion of which contains from 3 to 13 carbon atoms. The alkyl ester portion of the peroxyester usually contains 4 or 5 carbon atoms, e.g., the tertiary butyl or tertiary amyl radical. The aforesaid peroxyesters can be represented by the following graphic formula:

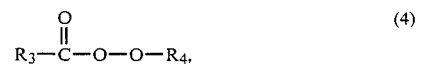

$$R_3-\overset{O}{\underset{\|}{C}}-O-O-R_4,\quad (4)$$

wherein $R_3$ is an alkyl radical of from 2 to 12, e.g., 5 to 10, carbon atoms and $R_4$ is an alkyl radical of 4 or 5 carbon atoms, most typically, the tertiary butyl or tertiary amyl radical, or the alpha cumyl radical. Examples of such peroxyesters include tertiarybutylperoxy pivalate, tertiaryamylperoxy pivalate, tertiarybutylperoctoate, tertiarybutyl perneodecanoate, tertiarybutylperoxy acetate, tertiarybutylperoxy isobutyrate, tertiarybutylperoxy-2-ethylhexanoate, tertiarybutylperoxy-3,5,5-trimethylhexanoate, tertiaryamyl peroxyneodecanoate, and alpha cumyl perneodecanoate. The aforesaid peroxyesters are typically prepared by treating the corresponding alkylhydroperoxide with an acylating agent.

In accordance with the present invention, a dispersion (emulsion or suspension) of the organic peroxide is prepared by dispersing the peroxide in water with a suitable dispersing aid, e.g., a surfactant or emulsifying agent. It is contemplated that the dispersion can contain between about 10 and 65 weight percent, typically between about 15 and 60, and more typically between 20 and 60, e.g., 40, weight percent, of the peroxide. Thereafter, the freezing point depressant is mixed with the dispersion in amounts sufficient to provide a composition that is liquid and readily pumpable at the temperature at which it is desired to store and/or handle the peroxide composition. If desired, the freezing point depressant can be charged to the water containing the surfactant before the peroxide is dispersed therein. The freezing point depressant, can be added undiluted if liquid, or an aqueous mixture of the freezing point depressant can be used. Amounts sufficient to depress the freezing point of the peroxide dispersion to the desired handling temperature, i.e., the temperature at which the dispersion is to be stored and/or shipped, are used. The specific amount of freezing point depressant required for any given peroxide dispersion can be readily ascertained by adding varying quantities of the freezing point depressant selected to the peroxide dispersion and measuring the freezing point of the resulting mixture.

As manufactured and stored, it is likely that the dispersion will contain a high percentage of the peroxide, e.g., 20 or 40 to 60 or 65 weight percent. However, when used as an initiator for the suspension polymerization of, for example, vinyl chloride, the peroxide composition of the present invention may be diluted, e.g., with water or with an aqueous solution of the freezing point depressant to values within the lower portion of the aforesaid range, e.g., from 10–20, for more precise monitoring of the amount of peroxide added to the polymerization reactor.

The preparation of aqueous organic peroxide dispersions is welldocumented in the literature. See, for example, U.S. Pat. No. 3,988,261. Generally, the surfactant(s) is dissolved in the aqueous medium and the organic peroxide added to the water phase with agitation. The order of addition of the two phases, i.e., whether the external phase is added to the internal phase or vice versa, is generally of no concerns since a dispersion can be prepared by the well-known inversion technique. However, the unstable characteristics and hazards associated with large quantities of organic peroxides suggests that it is best for the peroxide to be the discontinuous phase. Consequently, it is recommended that the organic peroxide be added slowly to the water phase to form the aqueous dispersion, e.g., emulsion.

The temperature at which the peroxide composition of the present invention is formed is not critical, but should be low enough to avoid loss of peroxide by homolytic decomposition. The specific temperature used will depend on the organic peroxide and difficulties associated with handling that peroxide at a given temperature. For highly reactive organic peroxides, it is recommended that the temperature of the aqueous medium be in the range of between about $+5°$ C. and $20°$ C. In the event that the surfactant(s) require higher temperatures for dissolution in the aqueous medium, the surfactant-water solution should be cooled before the peroxide is added to it. In preparing the peroxide composition, deionized or distilled water will typically be used.

Equipment used to prepare the peroxide dispersion is similarly well known. Any of the well-known equipment which is capable of breaking up or dispersing the internal phase, e.g., organic peroxide, in the external phase, e.g., water medium, so that the particle size of the resulting dispersion is sufficiently small to retard coalesence and resulting breakdown of the dispersed phase can be used. The choice of emulsification equipment is governed chiefly by the apparent viscosity of the dispersion in all stages of manufacture, the amount of mechanical energy input required and heat exchange demands, all of which are well known to persons skilled in the art. Examples of agitators capable of providing the proper degree of agitation are mechanically rotated paddle and anchor-type agitators; propeller agitation, i.e., one or more propellers mounted on a common shaft; turbine agitation, i.e., the use of fixed baffles, either on the mixing tank wall or adjacent to the propellers. Colloid mills and homogenizers are also suitable. Heat removal from the dispersion as it is being formed should be used to maintain the temperature of the total liquid medium below a temperature at which the organic peroxide undergoes significant homolytic decomposition.

The viscosity of the compositions of the present invention can vary but should be sufficiently free flowing to be handled by normal pumping means, i.e., the composition should be pumpable so that it can be handled in standard liquid handling equipment. The viscosity will vary depending on the amount of organic peroxide (and consequently the amount of water) that is used. The viscosity can be increased by known techniques, such as by adding thickeners to the continuous phase, by increasing the amount of the internal phase or by reducing the particle size of the emulsion. Preferably, the viscosity will be less than 500 poises, more preferably not more than 100 poises.

The amount of dispersing aid or emulsifier (hereinafter surfactant) used in the preparation of the peroxide dispersions of the present invention can vary; however, an amount of surfactant is used which is sufficient to provide a well dispersed, stable peroxide dispersion, i.e., an emulsifying amount. As a consequence, the peroxide remains dispersed at its designated storage temperature over such storage periods as are encountered in conventional commercial usage. Typically, the surfactant represents between about 1 and about 10 weight percent, more usually between about 3 and about 7 weight percent, e.g., about 5 weight percent, of the total dispersion. The exact amount of surfactant required can be ascertained easily by simple trial and error techniques using the aforementioned ranges as a guideline. Since surfactants are relatively expensive materials, only that amount which is required to accomplish the desired result are commonly used.

The surfactant should be soluble in the water phase to the extent required to perform the intended function and should remain dissolved in the water phase at all temperatures at which the dispersion is stored or handled. The surfactant should have a low chemical reactivity, i.e., it should be chemically inert or compatible with the organic peroxide and the freezing point depressant compound, and preferably should be compatible chemically with the polymerization environment to which the organic peroxide dispersion is added. It is contemplated that when magnesium halide is used as the freezing point depressant, nonionic surfactants will be used.

The surfactant can be anionic, cationic, nonionic or amphoteric. Typically, the surfactant will be anionic or nonionic, more typically non-ionic. Combinations of two or more surfactants or colloids are commonly used. Cationic and anionic surfactants are not used together since one would offset the surfactant properties of the other. Selection of a particularly useful surfactant for a particular organic peroxide can be facilitated by referring to the polymerization in which the organic peroxide emulsion will be used. In the aqueous polymerization, i.e., emulsion or suspension polymerization, of ethylenically unsaturated materials, emulsifiers and surfactants are used to maintain the polymer product dispersed within the aqueous polymerization medium. Anionic surfactants are commonly used with emulsion polymerizations while nonionic surfactants find extensive use in suspension polymerizations.

The subject of emulsions is covered in detail in Volume 8, pages 117-154 in the Kirk-Othmer Encyclopedia of Chemical Technology, second edition, John Wylie and Sons, Inc. 1965. A typical list of emulsifiers are presented on pages 128-130 of the aforementioned article. That article is hereby incorporated in toto by reference. The subject of surfactants is covered in Volume 19 of the aforementioned Encyclopedia of Chemical Technology on pages 507-593, which article is also herein incorporated by reference. A brief discussion of the anionic, cationic and nonionic surfactants described in the aforementioned article follows.

ANIONIC SURFACTANTS

Carboxylates—The carboxylate class of surfactants are represented principally by the soaps and aminocarboxylates. Soaps have the general composition, $(R'COO)^-(M)^+$ wherein $R'$ is an alkyl group, usually in the $C_9$–$C_{21}$ range and M is a metallic ion, e.g., alkali metal or alkaline earth metal such as sodium, potassium, magnesium, calcium, barium and iron, or hydrogen or an amine ion. The amine salts, i.e., wherein M is an amino group are excellent emulsifiers. Examples of $R'COO^-$ groups include lauroyl, oleoyl, stearoyl, cocoyl, and tall oil acyl.

Sulfonates—The sulfonate class of surfactants can be represented by the general formula, $R_4'SO_3M$, wherein $R_4'$ is a hydrocarbon group in the surfactant molecular weight range and M is typically an alkali metal, e.g., sodium, ammonium or amine group. Generally, the sulfonates are alkylbenzenesulfonates, petroleum sulfonates, sulfosuccinates, naphthalenesulfonates N-acyl-N-alkyltaurates, $\beta$-sulfoesters of fatty acids, or $\alpha$-olefin sulfonates.

The alkylbenzenesulfonates, i.e., $R_4''C_6H_4SO_3M$, are widely used. $R_4''$ is typically $C_4$–$C_{14}$ alkyl, e.g., dodecyl, tridecyl, or nonyl, and M is sodium, calcium, hydrogen, ammonium or triethanolamino. Dialkyl sulfosuccinates are generally available as the sodium salt. The alkyl portion of the ester are in the $C_4$–$C_{14}$ range, mainly the $C_4$–$C_8$ range.

Naphthalenesulfonates, $R_5C_{10}H_6SO_3M$, are generally the salts of alkylnaphthalenesulfonates, salts of sulfonated formaldehyde-naphthalene condensates, salts of naphthalenesulfonates, and salts of tetrahydronaphthalenesulfonates, $R_5$ is typically $C_3$–$C_9$ alkyl. M is usually sodium or hydrogen.

Sulfates and Sulfated Products—The sulfate surfactants are grouped generally into sulfated alcohols, sulfated natural fats and oils, sulfated acids, amides and esters, ethoxylated and sulfated alkylphenols and ethoxylated and sulfated alcohols. Alkyl sulfates, $R_6OSO_3M$, are useful as emulsifiers and dispersants in emulsion polymerization. $R_6$ is typically $C_8$–$C_{18}$ alkyl, e.g., lauryl, 2-ethylhexyl, cetyl, oleyl, and octyl; while M is alkali, alkaline earth metal, e.g., sodium, potassium or magnesium, ammonium, triethanolamino, or diethanolamino.

Sulfated natural fats and oils are generally derivatives of tallow, castor oil, sperm oil, coconut oil, cod oil, neats'-foot oil, peanut oil and soybean oil. Sulfated polyoxyethylene alkylphenols, $R_7C_6H_4(OCH_2CH_2)_nOSO_3M$, are efficient emulsifiers and dispersants. $R_7$ is usually $C_9$ (nonyl), or $C_{12}$ (dodecyl), n is 2 to 5 and M is as defined hereinbefore, e.g., sodium, ammonium or triethanolamino. Sulfated polyoxyethylene alcohols, $R_8(OCH_2CH_2)_nOSO_3M$ are also useful in emulsion polymerization. $R_8$ is usually $C_{12}$–$C_{14}$, e.g., lauryl, tridecyl, or myristyl, n is 1 to 4 and M is as defined hereinbefore, i.e., usually sodium, ammonium or triethanolamino.

Phosphate Esters—Alkylphosphate and alkyl polyphosphate surfactants are also used as polymerization emulsifiers. The alkyl portion typically varies from $C_8$–$C_{18}$. Di(2-ethylhexyl)phosphate is typical of the orthophosphate esters, and a typical polyphosphate is (2-ethylhexyl)$_5$-Na$_5$(P$_3$O$_{10}$)$_2$.

NONIONIC SURFACTANTS

Nonionic surfactants can be classed into the following groups: ethoxylated alkylphenols, ethoxylated aliphatic alcohols, carboxylic esters, carboxylic amides and polyoxyalkylene oxide block copolymers.

Ethoxylated alkylphenols—These nonionic surfactants are prepared from $C_6$–$C_{12}$ alkyl substituted phenols. The number of moles of ethylene oxide per mole of hydrophobe (alkyl phenol) can vary between 1.5 and about 30. The weight percent of combined ethylene oxide is usually from 40-95 percent to achieve good water solubility, more typically 60-95 percent. Nonylphenoxypoly (ethyleneoxy) ethanol is an example of this type of material.

Ethoxylated Aliphatic Alcohols—These nonionic surfactants are generally prepared from $C_{12}$–$C_{18}$ alcohols or mixtures of alcohols of that chain length and the mole ratio of combined ethylene oxide to hydrophobe varies from about 1 to 50, more often from 4 to 20. Examples of alcohols that can be ethoxylated are lauryl, oleyl, cetyl, stearyl, tridecyl, myristyl, trimethylnonyl, $C_{12}$–$C_{15}$ primary linear and $C_{11}$–$C_{15}$ secondary alcohol.

Carboxylic Esters—Examples of these type of surfactants are the glycerol esters, polyethylene glycol esters, anhydrosorbitol esters, ethoxylated anhydrosorbitol esters, ethylene and diethylene glycol esters, propanediol esters and ethoxylated natural fats and oils. The glycerol esters are either mono- or diglycerides of fatty acids, usually $C_{12}$–$C_{18}$ fatty acids. The polyethylene glycol-esters are also esters of fatty, rosin, and tall oil acids. The fatty acids also generally contain 12 to 18 carbon atoms. The mono-, di- or triesters of sorbitan and fatty acids are the most typical commercially available fatty acid esters of anhydrosorbitol. Sorbitan is a mixture of anhydrosorbitols of which 1,4-sorbitan and isosorbide are the principal components. The fatty acids are typically the $C_{12}$–$C_{18}$ fatty acids. Ethoxylation of the sorbitan fatty acid esters leads to a series of more hydrophilic surfactants. The number of oxyethylene units per mole of ester varies usually between 4 and 20.

The ethylene glycol, diethylene glycol and 1,2-propanediol esters of fatty acids having 12 to 18 carbon atoms are also used as surfactants. Ethoxylated castor oil and lanolin derivatives are the significant volume products of the ethoxylated natural fats and oils.

Polyvinyl Alcohol—Polyvinyl alcohol (PVA) is a hydrophilic colloid resin prepared by the acid or alkaline hydrolysis of a vinyl polymer, usually poly(vinyl acetate). The molecular weight of the PVA depends on the molecular weight of the parent polymer. The degree of hydrolysis of the parent polymer will vary the properties of the PVA. For use as a water soluble surfactant, hydrolysis should be substantial, e.g., 65 percent or more of the acetate groups should be hydrolyzed. The weight average molecular weight of the parent poly(vinyl acetate) is reported to vary between 11,000 and 1,500,000.

Water-Soluble Cellulose Ethers—Water-soluble cellulose ethers can also be used as surfactants in the present process. The cellulose ethers of commercial importance can be classified into three types. They are: (1) ionic-carboxymethylcellulose, e.g., sodium carboxymethylcellulose, (2) hydroxyalkylcellulose, e.g., hydroxyethylcellulose and (3) nonionicalkylcellulose, e.g., methylcellulose.

Sodium carboxymethylcellulose is a hydrophilic colloid that is anionic in character and is useful for stabilizing emulsions. A derivative, sodium carboxymethylhydroxyethylcellulose, is less sensitive to precipitation by salt solutions and acid, and is also useful in preparing the emulsions of the present process. Hydroxyethylcellulose is the principal commercial hydroxyalkylcellulose; however, hydroxypropylcellulose can also be used. Examples of alkyl cellulose include methylcellulose and ethylcellulose. Other water-soluble ethers include methylhydroxypropylcellulose, ethylhydroxyethylcellulose and methylethylcellulose. The degree of substitution (the average number of hydroxyl groups of the three available in the anhydroglucose unit that have been substituted) of the aforementioned cellulose ethers is usually at least about 0.5 and preferably at least 0.8 in order to attain water solubility.

Other hydrophilic-organic colloids that can be used in the present process in addition to the surfactants include the vegetable and other gums, e.g., starch, gelatin, pectin, and sodium alginate; and, inorganic suspending agents, such as the clays, bentonites and other finely-divided solids. For ease of reference, all of the aforementioned ingredients used to emulsify the peroxide (other than water) will be referred to as surfactants.

CATIONIC SURFACTANTS

The hydrophilic moieties in cationic surfactants are usually the quaternary nitrogens. The quaternary ammonium salts can be categorized into dialkyldimethylammonium salts, alkybenzyldimethylammonium salts (chlorides), alkytrimethylammonium salts and alkylpyridinium halides. The quaternary salts are usually halides, e.g., chlorides or bromides, sulfates or sulfonates.

Water used to prepare the peroxide dispersion and the aqueous solution of the freezing point depressant can be deionized, or demineralized and deionized water to prevent the introduction of possible contaminants into the dispersion and subsequently into the polymerization system to which the peroxide is charged. The amount of water present in the composition of the present invention will depend on the concentration of the organic peroxide in the aqueous dispersion. Generally, the composition of the present invention comprises the organic peroxide, surfactant, freezing point depressant and the remainder water.

The peroxide compositions of the present invention are stored at temperatures at which the peroxide does not readily undergo homolytic decomposition, e.g., 0° C. to −20° C. The composition can be charged directly to the polymerization vessel or, if desired, diluted, e.g., with water, before being introduced into such vessel. Since the compositions are liquid and non-segregating, i.e., they remain dispersed during storage, they can be pumped from storage to the point of end use. The peroxide composition is used in amounts predetermined to initiate and sustain the polymerization reaction. Typically, enough of the peroxide composition is charged to the polymerization vessel to provide therein from about 0.01 to 2.5 weight percent of the peroxide, basis the ethylenically unsaturated monomer.

Although the present invention has been described with reference to specific details of certain embodiments thereof, it is not intended that such details be regarded as limitations upon the scope of the invention except as and to the extent that they are included in the accompanying claims.

What is claimed is:

1. An organic peroxide composition consisting essentially of:
  (a) an aqueous organic peroxide dispersion of from about 10 to 65 weight percent of an organic peroxide that is liquid at 0° C., water, and sufficient surfactant to provide a well dispersed peroxide, and
  (b) between about 2 and about 30 weight percent, based on the amount of water in the organic peroxide dispersion, of a material selected from the group consisting of: (1) polyhydric paraffinic alcohols selected from the group consisting of pentaerythritol and 1,2,6-hexane triol, (2) monosaccharides, (3) metal chloride salts of the metals sodium, lithium, potassium and magnesium, and (4) mixtures of such materials, to provide a liquid peroxide composition which is pumpable at between about 0° C. and −20° C., said organic peroxide being selected from the group consisting of: (i) organic peroxydicarbonate esters represented by the graphic formula:

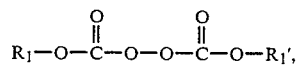

wherein $R_1$ and $R_1'$ are each an alkyl radical of from 2 to 8 carbon atoms, (ii) diacyl peroxides represented by the graphic formula:

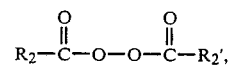

wherein $R_2$ and $R_2'$ are each an alkyl radical of from 2 to 4 carbon atoms, and (iii) peroxyesters represented by the graphic formula:

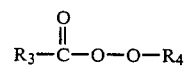

wherein $R_3$ is an alkyl radical of from 2 to 12 carbon atoms and $R_4$ is alpha cumyl or an alkyl radical of from 4 to 5 carbon atoms.

2. The composition of claim 1 wherein the aqueous peroxide dispersion contains from 20 to 60 weight percent of the peroxide and from 2 to 30 weight percent of the material of group (b), basis the amount of water in the peroxide dispersion, is used.

3. A liquid organic peroxide composition which is pumpable at between −20° C. and 0° C., consisting essentially of:
  (a) an aqueous organic peroxydicarbonate ester dispersion of from about 10 to about 65 weight percent of the peroxydicarbonate ester, water, and sufficient surfactant to provide a well dispersed peroxydicarbonate ester, and (b) between 2 and 30 weight percent, basis the amount of water in the peroxydicarbonate ester, of a material selected from the group consisting of: (1) polyhydric paraffinic alcohols selected from the group consisting of pentaerythritol and 1,2,6-hexanetriol, (2) $C_4$–$C_6$ monosaccharides, (3) metal chloride salts of the metals sodium, lithium, potassium and magnesium, and (4) mixtures of such materials, said peroxydicarbonate ester being represented by the graphic formula:

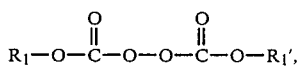

wherein $R_1$ and $R_1'$ are each an alkyl radical of from 2 to 8 carbon atoms.

4. The organic peroxide composition of claim 3 wherein the peroxydicarbonate ester is diisopropyl peroxydicarbonate, di-n-propyl peroxydicarbonate, di-secondarybutyl peroxydicarbonate, or di-2-ethylhexyl peroxydicarbonate.

5. In the process of polymerizing ethylenically unsaturated materials in an aqueous medium with an organic peroxide initiator, the improvement which comprising using as the initiator the organic peroxide composition of claim 1 in amounts sufficient to initiate and sustain the polymerization.

6. In the process of polymerizing ethylenically unsaturated materials in an aqueous medium with an organic peroxide initiator, the improvement which comprising using as the initiator the organic peroxide composition of claim 4 in amounts sufficient to initiate and sustain the polymerization.

7. The process of claim 5 or 6 wherein the ethylenically unsaturated material is vinyl chloride.

* * * * *